(12) United States Patent
Sheth

(10) Patent No.: US 6,988,148 B1
(45) Date of Patent: Jan. 17, 2006

(54) IP POOL MANAGEMENT UTILIZING AN IP POOL MIB

(75) Inventor: Purnam Anil Sheth, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 748 days.

(21) Appl. No.: 09/765,981

(22) Filed: Jan. 19, 2001

(51) Int. Cl.
*G06F 15/16* (2006.01)

(52) U.S. Cl. ................ 709/245; 709/220; 709/223

(58) Field of Classification Search ........... 709/226, 709/224, 223, 220, 245, 221, 222
See application file for complete search history.

(56) References Cited

U.S. PATENT DOCUMENTS

| | | | |
|---|---|---|---|
| 5,241,594 A | 8/1993 | Kung | 380/4 |
| 5,367,635 A | 11/1994 | Bauer et al. | 395/200 |
| 5,561,703 A | 10/1996 | Arledge et al. | 379/57 |
| 5,581,478 A | 12/1996 | Cruse et al. | 364/505 |
| 5,592,538 A | 1/1997 | Kosowsky et al. | 379/93 |
| 5,610,910 A | 3/1997 | Focsaneanu et al. | 370/351 |
| 5,621,721 A | 4/1997 | Vatuone | 370/16 |
| 5,655,077 A | 8/1997 | Jones et al. | 395/187.01 |
| 5,671,354 A | 9/1997 | Ito et al. | 395/187.01 |
| 5,684,950 A | 11/1997 | Dare et al. | 395/187.01 |
| 5,699,521 A | 12/1997 | Iizuka et al. | 395/200.15 |

(Continued)

FOREIGN PATENT DOCUMENTS

WO 97/13352 4/1997

(Continued)

OTHER PUBLICATIONS

Active Software, Inc., "Active Software's Integration System", printed from http://www.activesw.com/products/products.html, on Jul. 24, 1998.

(Continued)

*Primary Examiner*—Bharat Barot
*Assistant Examiner*—Benjamin Bruckart
(74) *Attorney, Agent, or Firm*—Thelen Reid & Priest LLP; John P. Schaub

(57) ABSTRACT

A method for managing Internet Protocol (IP) addresses on a data communications network includes allocating multiple local IP address pools, requesting IP address usage data from one or more of the network edge devices, receiving the requested IP address usage data, determining whether the local IP address pools should be reallocated based upon the requested IP address usage data, reallocating one or more of the local IP address pools based upon the determination and updating one or more of the local IP address pool databases and a global IP pool database based upon the reallocating. Each of the local IP address pools is associated with a different network edge device that is capable of accepting connection requests requiring an IP address. The global IP address pool database includes the information maintained in each local IP address pool. A network edge device capable of managing IP addresses on a data communications network includes an allocator capable of allocating multiple local IP address pools, a receiver capable of receiving a communication, an allocator capable of allocating an available IP address from the local IP address pool if the communication includes a connection request, a determiner capable of determining whether the local IP address pool should be adjusted, a notifier capable of sending an alarm message to an IP pool manager when the IP address pool should be adjusted and a memory capable of storing an IP address allocation when the communication includes an IP address allocation.

52 Claims, 9 Drawing Sheets

U.S. PATENT DOCUMENTS

| | | | |
|---|---|---|---|
| 5,715,394 A | 2/1998 | Jabs | 395/200.11 |
| 5,717,604 A | 2/1998 | Wiggins | 364/514 |
| 5,734,654 A | 3/1998 | Shirai et al. | 370/396 |
| 5,745,556 A | 4/1998 | Ronen | 379/127 |
| 5,764,736 A | 6/1998 | Shachar et al. | 379/93.09 |
| 5,764,756 A | 6/1998 | Onweller | 379/242 |
| 5,768,521 A | 6/1998 | Dedrick | 395/200.54 |
| 5,778,182 A | 7/1998 | Cathey et al. | 395/200.49 |
| 5,812,529 A | 9/1998 | Czarnik et al. | 370/245 |
| 5,835,720 A | 11/1998 | Nelson et al. | 395/200.54 |
| 5,835,725 A | 11/1998 | Chiang et al. | 395/200.58 |
| 5,835,727 A | 11/1998 | Wong et al. | 395/200.68 |
| 5,838,682 A | 11/1998 | Dekelbaum et al. | 370/401 |
| 5,838,683 A | 11/1998 | Corley et al. | 370/408 |
| 5,838,994 A | 11/1998 | Valizadeh | 395/876 |
| 5,845,070 A | 12/1998 | Ikudome | 395/187.01 |
| 5,852,812 A | 12/1998 | Reeder | 705/39 |
| 5,854,901 A | 12/1998 | Cole et al. | 395/200.75 |
| 5,867,495 A | 2/1999 | Elliott et al. | 370/352 |
| 5,889,774 A | 3/1999 | Mirashrafi et al. | 370/352 |
| 5,898,780 A | 4/1999 | Liu et al. | 380/25 |
| 5,905,736 A | 5/1999 | Ronen et al. | 370/546 |
| 5,913,037 A | 6/1999 | Spofford et al. | 395/200.56 |
| 5,918,016 A | 6/1999 | Brewer et al. | 395/200.5 |
| 5,922,051 A | 7/1999 | Sidey | 209/223 |
| 5,926,458 A | 7/1999 | Yin | 370/230 |
| 5,944,824 A | 8/1999 | He | 713/201 |
| 5,968,116 A | 10/1999 | Day, II et al. | 709/202 |
| 5,970,477 A | 10/1999 | Roden | 705/32 |
| 5,974,453 A | 10/1999 | Andersen et al. | 709/220 |
| 5,991,828 A | 11/1999 | Horie et al. | 710/8 |
| 6,009,103 A | 12/1999 | Woundy | 370/401 |
| 6,011,910 A | 1/2000 | Chau et al. | 395/200.59 |
| 6,018,619 A | 1/2000 | Allard et al. | 395/200.54 |
| 6,021,429 A | 2/2000 | Danknick | 709/202 |
| 6,026,087 A | 2/2000 | Mirashrafi et al. | 370/389 |
| 6,026,441 A | 2/2000 | Ronen | 709/227 |
| 6,035,281 A | 3/2000 | Crosskey et al. | 705/14 |
| 6,052,725 A * | 4/2000 | McCann et al. | 709/223 |
| 6,055,236 A | 4/2000 | Nessett et al. | 370/389 |
| 6,091,951 A | 7/2000 | Sturniolo et al. | 455/432 |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 6,178,455 B1 | 1/2001 | Schutte et al. | 709/228 |
| 6,249,813 B1 | 6/2001 | Campion et al. | 709/222 |
| 6,266,523 B1 * | 7/2001 | Cook et al. | 455/403 |
| 6,282,575 B1 | 8/2001 | Lin et al. | 709/244 |
| 6,381,650 B1 | 4/2002 | Peacock | 709/245 |
| 6,513,066 B1 | 1/2003 | Hutton et al. | |
| 6,564,216 B2 * | 5/2003 | Waters | 707/10 |
| 6,577,628 B1 | 6/2003 | Hejza | 370/392 |
| 6,587,455 B1 | 7/2003 | Ray et al. | 370/352 |
| 6,618,757 B1 | 9/2003 | Babbitt et al. | 709/226 |
| 6,763,012 B1 | 7/2004 | Lord et al. | 370/338 |
| 6,795,709 B2 | 9/2004 | Agrawal et al. | 455/452.1 |
| 6,799,204 B1 | 9/2004 | Baba et al. | 709/220 |
| 2001/0025312 A1 | 9/2001 | Obata | 709/226 |
| 2001/0044893 A1 | 11/2001 | Skemer | 713/153 |
| 2002/0013847 A1 * | 1/2002 | Fisher et al. | 709/226 |
| 2002/0138614 A1 | 9/2002 | Hall | 709/225 |
| 2002/0155827 A1 | 10/2002 | Agrawal et al. | 455/414 |
| 2003/0115345 A1 | 6/2003 | Chien et al. | 709/229 |

FOREIGN PATENT DOCUMENTS

| | | |
|---|---|---|
| WO | 97/13382 | 4/1997 |
| WO | 99/53408 | 10/1999 |
| WO | WO01/17199 A1 | 3/2001 |

OTHER PUBLICATIONS

Alexander, S., "DHCP Optios and BOOTP Vendor Extensions," Network Working Group, RFC 1533, Oct. 1993.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "Cisco DNS/DHCP Manager V.1.1", printed from http://www.combinet.com/warp/public/751/dnsmg_ds.htm, on Sep. 10, 1998, 4 pages.

Droms, R., "Dynamic Host Configuration Protocol." Network Working Group, RFC 1531, Oct. 1993.

IBM, "IBM introduces new subscriber management system for Internet service providers", Dec. 2, 1998, IBM News, p. 1.

Network Registrar, "Regain Confidence and Control Over Your IP Address Infrastructure", American Internet Corporation, Bedford, MA.

Network Registrar, "Hot Products & Solutions—IP Address Management: A White Paper", American Internet Corporation, Bedford, MA, printed from http://www.american.com/ip-mgmt.html, on Jul. 24, 1998.

"Network Address Translation Information", printed from http://www.uq.edu.au/~gadmacka/content/natinformation.htm, on Sep. 19, 1998.

Rigney, et al., "Remote Authentication Dial In Use Service (RADIUS)", Network Working Group, RFC 2138, Apr. 1997, pp. 1-57.

"Three Ways to Manage IP Addresses", PC Magazine: IP Address Management, printed from htto://www.zdnet.com/pcmag/features/ipmanage/ip-s2.htm, on Sep. 10, 1998.

* cited by examiner

IP POOL MANAGEMENT UTILIZING AN IP POOL MIB

FIELD OF THE INVENTION

The present invention relates to the field of data communications. More particularly, the present invention relates to a system and method for Internet Protocol (IP) pool management utilizing an IP pool Management Information Base (MIB).

BACKGROUND OF THE INVENTION

As local area network (LAN) and wide area network (WAN) topologies become more complex, network management tools become critically important. As is known to those skilled in the art, the Simple Network Management Protocol ("SNMP") is one currently popular example of a network management tool. SNMP provides a systematic way of monitoring and managing a computer network and has become the standard in network management. The SNMP model of a managed network includes four types of components: (1) managed nodes or network elements, (2) management stations, (3) management information, and (4) a management protocol. The managed nodes can be hosts, routers, bridges, printers, or any other devices capable of communicating status information to the management stations. Management stations monitor and manage the devices on the network. The management information contains information on the components of the network and the management protocol is the format in which this information is communicated to the management system. The Cisco-Works™ software package, available from Cisco Systems, Inc. of San Jose, Calif., is an example of network management product supporting SNMP.

Many networks contain components manufactured by several different companies. In order for the management station to communicate effectively with these varied devices, the nature of the information maintained by the agents must be rigidly specified. SNMP therefore describes the exact information each agent must maintain and the format in which it must be maintained in data structures called management information bases (MIB).

A MIB is a local database of variables that may describe the current and past state of the node to which it is assigned as well as instructions affecting the operation of the node. Network management is then carried out by the management stations. The management stations have one or more processes that communicate with the SNMP agents through the network by issuing commands and getting responses. One of the advantages of this design is that much of the complexity of the system is located in the management stations, rather than in the SNMP agents, allowing the agents to be as simple as possible to minimize their effect on the nodes on which they are running.

Data communications networks are widespread and there are many different types of networks, including LANs (Local Area Networks), MANs (Metropolitan Area Networks), and WANs (Wide Area Networks). They are used for providing numerous services, both for companies and for individuals. They provide a powerful communication mechanism and allow access to various kinds of remote information. Two or more networks connected together form an internetwork (or internet). The "Internet" is a worldwide internet widely used to connect universities, government offices, companies, and private individuals. Every host (or end-user's machine running user applications) and router interface on the Internet has an Internet Protocol (IP) address, which encodes its network number and host number. IP addresses are typically 32 bits long and are used in the source address and destination address fields of IP packets. The Source Address is the ultimate source of the IP packet; the Destination Address is the ultimate destination of the IP packet.

FIG. 1 illustrates IP address formats well known to those of ordinary skill in the art. The IP address formats are divided into five classes. The class A format 100, which begins with a "0" bit 102 for indicating the class and has a 7-bit network address field 105 and a 24-bit host address field 110, allows up to 126 networks with 16 million hosts each. The class B format 115 beginning with the bit pattern "10" 120 allows 16,382 networks with up to 64K hosts each. The class C format 125 beginning with the bit pattern "110" 130 allows 2 million networks (e.g., LANs) with up to 254 hosts each. The class D format 135 beginning with "1110" 140 is for multicast in which a packet is directed to multiple hosts. Finally, the Class E format 145 beginning with the bit pattern "11110" 150 is reserved for future use. Network numbers are assigned by the InterNIC (Internet Network Information Center) or another administrative body in order to avoid conflicts.

The growth of the Internet appears to be exponential. Tens of thousands of networks are now connected to the Internet, and the number is close to doubling every year. Unfortunately, however, IP addresses are not infinite and it is rather expensive to procure more IP addresses. With the increase in the number of users of the Internet, Telcos (Telecommunication companies) and ISPs (Internet Service Providers) are faced with an increasing shortage of IP addresses.

The network edge is the point where customer traffic enters a service provider's network. Traffic can arrive at the edge via access technologies including dial, IP, ATM, Frame Relay, leased line, wireless, Digital Subscriber Line (xDSL) and cable. An edge switch or edge router aggregates traffic from all or some of these access interfaces, and forwards packets over a multiplexed packet network core.

FIG. 2 depicts an exemplary network edge. DSL access multiplexer 200 terminates and aggregates DSL connections 205, 210, 215. Router 220 aggregates leased lines 225, 230. Cable modem termination system (CMTS) 235 terminates and aggregates cable modem connections 240, 245. Media gateway 250 translates PSTN 255 traffic into packets. Network edge 260 may also contain multiservice switches (not shown in FIG. 2) for delivering services including Frame Relay, leased lines, ATM, IP and voice. Packets from network edge devices 202, 220, 235, 250 are forwarded over packet network core 260.

IP pools 212, 232, 242 and 252 are typically utilized on network edge devices 202, 220, 235, 250 to hold a pool of addresses that can be used for dynamic address assignment for PPP sessions as they are terminated on edge aggregation devices 202, 220, 235, 250. Frequently, several network edge devices must share a single IP address space. Consequently, the addresses must be divided amongst the edge termination devices 202, 220, 235, 250. Currently, IP addresses are allocated in a manual fashion. One or more individuals 265, 270, 275, 280 assign a range of IP addresses to each device 202, 220, 235, 250. Scripts are used to periodically review IP address usage to determine whether efficient use is being made of the IP address space allocated to edge termination devices 202, 220, 235, 250. Address ranges are reallocated when individuals 265, 270, 275, 280 determine that more efficient use can be made of the IP address space. Unfortunately, the dynamic nature of IP address requests complicates IP address management. Improper management of IP address pools can result in IP address pool depletion and the subsequent denial of service.

The currently available solutions to this problem are very limited and do not offer the level of service that most subscribers demand. One solution places global IP address information in an authentication, authorization and accounting (AAA) server. However, this solution is inadequate because if an AAA server goes down, IP address information may be lost.

What is needed is a solution that provides relatively efficient and reliable management of network edge device IP address pools, such that subscriber denial of service is minimized. A further need exists for such a solution that is relatively easy to implement.

BRIEF DESCRIPTION OF THE INVENTION

A method for managing Internet Protocol (IP) addresses on a data communications network includes allocating multiple local IP address pools, requesting IP address usage data from one or more of the network edge devices, receiving the requested IP address usage data, determining whether the local IP address pools should be reallocated based upon the requested IP address usage data, reallocating one or more of the local IP address pools based upon the determination and updating one or more of the local IP address pool databases and a global IP pool database based upon the reallocating. Each of the local IP address pools is associated with a different network edge device that is capable of accepting connection requests requiring an IP address. The global IP address pool database includes the information maintained in each local IP address pool. A network edge device capable of managing IP addresses on a data communications network includes an allocator capable of allocating multiple local IP address pools, a receiver capable of receiving a communication, an allocator capable of allocating an available IP address from the local IP address pool if the communication includes a connection request, a determiner capable of determining whether the local IP address pool should be adjusted, a notifier capable of sending an alarm message to an IP pool manager when the IP address pool should be adjusted and a memory capable of storing an IP address allocation when the communication includes an IP address allocation.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Figure 1:
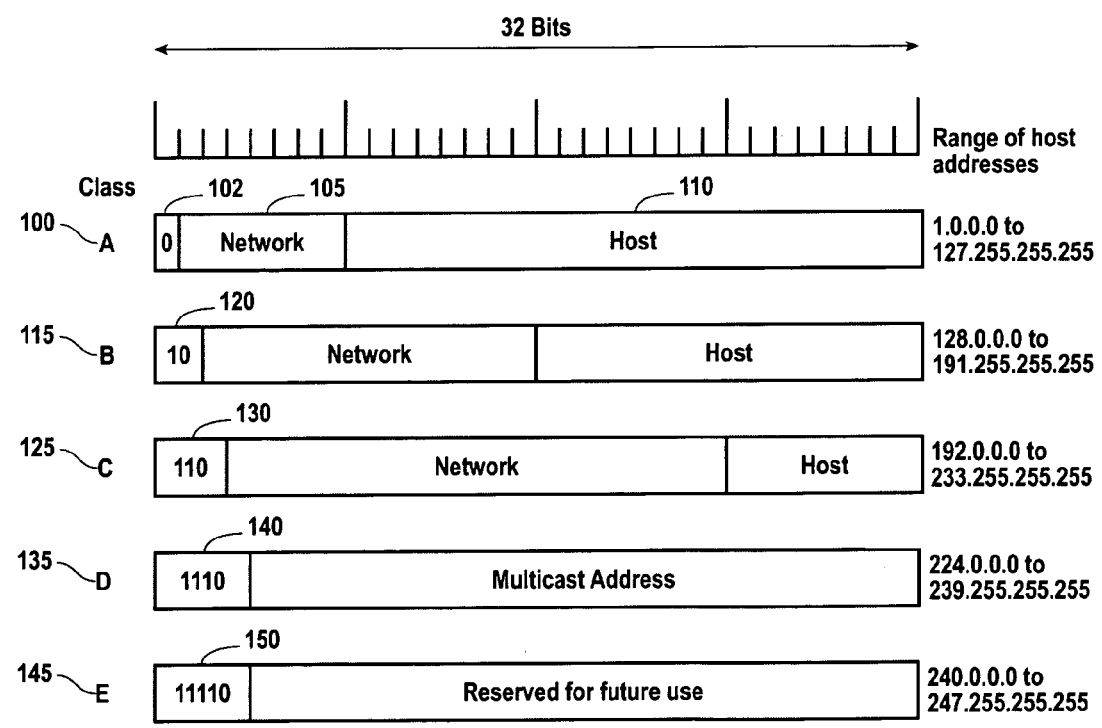
FIG. 1 is a block diagram that illustrates Internet Protocol (IP) address formats.
Figure 2:
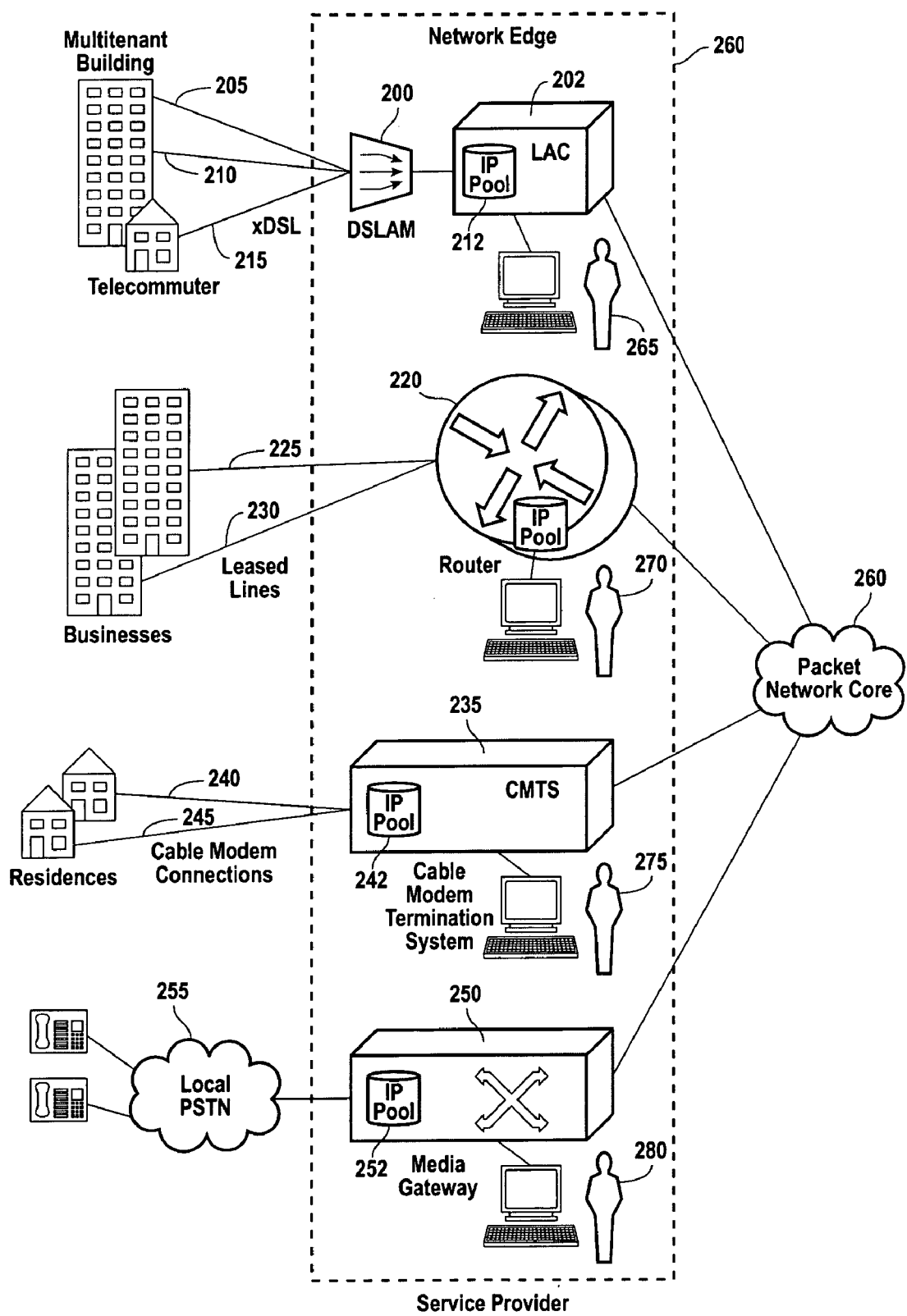
FIG. 2 is a block diagram that illustrates a network edge.

Embodiments of the present invention are described herein in the context of a system and method for IP pool management using an IP pool MIB. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks; the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

As is known to those skilled in the art, network devices may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB. Embodiments of the present invention use in-band network management techniques.

Embodiments of the present invention can use the Internet Protocol or a proprietary Cluster Management Protocol ("CMP") as the underlying mechanism to transport the SNMP configuration and management data. Without limitation, the protocols implemented in embodiments of the present invention include the Internet Protocol ("IP"), the Internet Control Message Protocol ("ICMP"), the User Datagram Protocol ("UDP"), the Trivial File Transfer Protocol ("TFTP"), the Bootstrap Protocol ("BOOTP"), and the Address Resolution Protocol ("ARP").

The MIB variables of network devices according to embodiments of the present invention are accessible through SNMP. As has been mentioned earlier, SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, a SNMP manager can get a value from a SNMP agent or store a value into that SNMP agent. The SNMP manager can be part of a network management system ("NMS"), and the SNMP agent can reside on a networking device such as a LAN switch. The device MIB files may be compiled with network management software, which then permits the SNMP agent to respond to MIB-related queries being sent by the NMS.

As has already been mentioned, the CiscoWorks™ software package is an example of network management product supporting SNMP. CiscoWorks™ uses the device MIB variables to set device variables and to poll devices on the network for specific information. Among other tasks, the CiscoWorks™ software permits the results of a poll to be displayed as a graph and analyzed in order to troubleshoot internetworking problems, increase network performance, verify the configuration of devices, and monitor traffic loads. Other products known to those skilled in the art, available from several other vendors, provide similar functionality.

Figure 3:
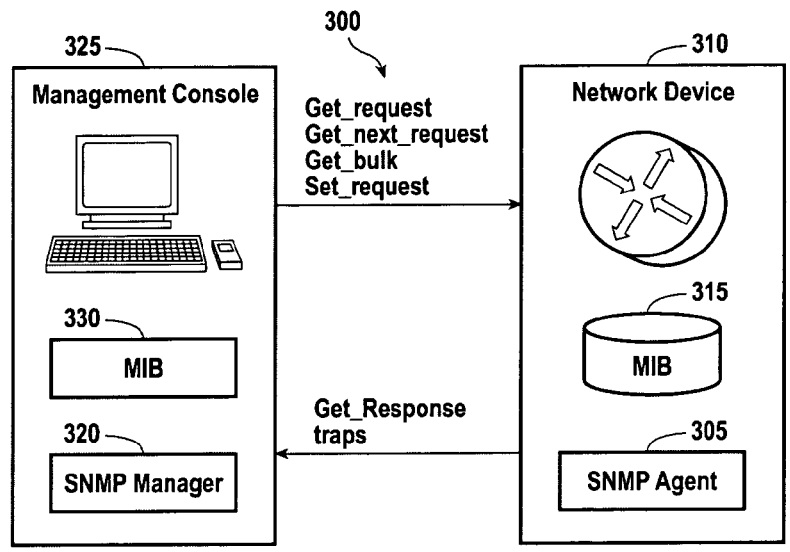
FIG. 3 is a block diagram that illustrates a SNMP network.

Referring now to FIG. 3, an exemplary SNMP network 300 is shown. The SNMP agent 305 in network device 310 gathers data from the MIB 315, also in network device 310. The MIB 315 is the repository for information about device parameters and network data. The SNMP agent 305 can send traps, or notification of certain events, to the SNMP manager 320, which is part of the Network Management Software running on the management console 325. Exemplary SNMP operations are described in Table 1, listed below.

TABLE 1

| Operation | Description |
| --- | --- |
| Get-request | Retrieve a value from a specific MIB variable. |
| Get-next-request | Retrieve a value from a variable within a table. With this operation, a SNMP manager does not need to know the exact variable name. A sequential search is performed to find the needed variable within a table. |
| Get-response | The reply to a get-request, get-next-request, and set-request sent by a NMS. |
| Set-request | Store a value in a specific variable. |
| Trap | An unsolicited message sent by a SNMP agent to a SNMP manager indicating that some event has occurred. |

As is known to those skilled in the art, the SNMP model typically assumes that each managed network device is capable of running a SNMP agent internally. However, some devices, such as older devices that were not originally intended for use on a network, may not have this capability. To handle them, the SNMP protocol defines what is called a "SNMP proxy agent," namely an agent that watches over one or more non-SNMP devices and communicates with the management console on their behalf, typically communicating with the non-SNMP devices themselves using some nonstandard or proprietary protocol. Typically, the SNMP proxy agent operates by translating the SNMP interactions it receives from the management console into whatever protocols are supported by the foreign device.

Figure 4:
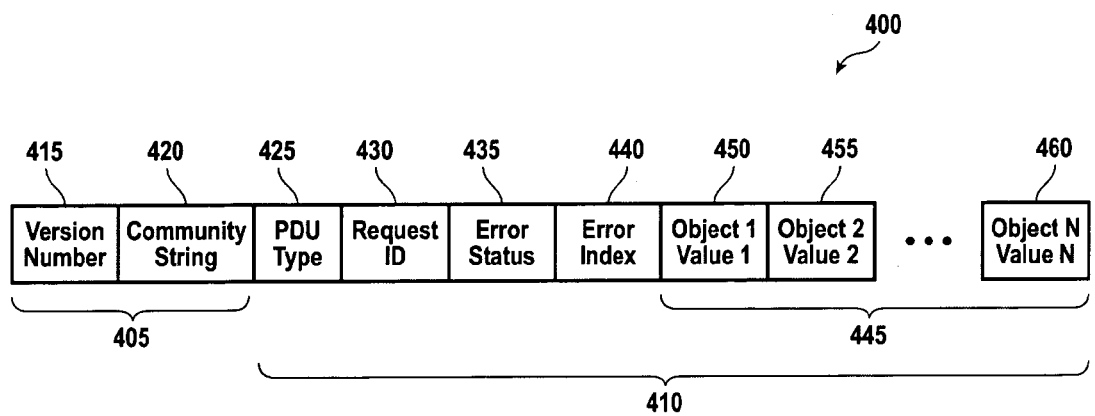
FIG. 4 is a block diagram that illustrates a SNMP message format.

FIG. 4 is a block diagram illustrating an exemplary SNMP message format known to those skilled in the art. FIG. 4 illustrates the message format for a version of SNMP known to those skilled in the art as "SNMPv1." Depending on the requirements of each particular implementation, embodiments of the present invention may be implemented using other versions of SNMP, or using versions of other network management protocols known to those skilled in the art.

As shown in FIG. 4, SNMP message 400 comprises a message header 405 and a Protocol Data Unit ("PDU") 410. Message header 405 comprises a Version Number field 415 and a Community String 420. Version Number field 415 specifies the version of the SNMP protocol being used, while community string 420 defines an access environment for a group of network management stations/consoles. Network management stations/consoles within a community are said to exist within the same administrative domain. As is known to those skilled in the art, community strings serve as a weak form of authentication because devices that do not know the proper community name are precluded from SNMP operations.

Still referring to FIG. 4, PDU 410 of SNMP message 400 comprises a PDU Type field 425, Request ID field 430, Error Status field 435, Error Index field 440, and a Variable Bindings field 445. As is known to those skilled in the art, PDU fields are variable in length. PDU Type field 425 specifies the type of PDU transmitted (e.g., Get, GetNext, Response, Set). Request ID field 430 associates a SNMP requests with the corresponding response. Error Status field 435 indicates one of a number of errors and error types. Only the response operation sets this field. Other operations set this field to zero. Error Index field 440 associates an error with a particular object instance (if there is an error, the error index is set to a non-zero error code). Variable Bindings field 445 serves as the data field of the SNMP PDUs. As is known to those skilled in the art, each variable binding 450, 455, 460 associates a particular object instance with its current value (with the exception of Get and GetNext requests, for which the value is ignored). It should be noted that, as is known to those skilled in the art, SNMP also defines a PDU known as a "trap."

There are a great number of different possible management information base types in version 2 of SNMP. One type is known as an expression MIB. It is sometime advantageous for a management station to evaluate expressions of the variables contained in the management information bases of each agent. This is generally done for testing purposes to ensure that the network is running properly. For example, a MIB may contain variable A and variable B. In order to test for a certain property it may be necessary to check whether A+B exceeds a certain preset number. For years, this would be performed by the management station occasionally polling and retrieving the MIB of the agent (via the SNMP protocol), receiving the values for A and B, then adding A+B and comparing the result to the preset number. In large systems, however, this frequent and repetitive polling increases network traffic to such an extent as to significantly decrease the overall efficiency of the system.

In order to alleviate this concern, expression management information bases were created. Like a normal MIB, an expression MIB is contained on an agent. However, an expression MIB contains variables that are evaluated expressions of variables contained in another MIB on that agent. The evaluated expressions may also contain constants. For example, a normal MIB on an agent may contain variables A and B. The expression MIB for that agent could then contain one or more variables representing A+B, A−B, A*B, A/B, AB/2, B+A+4 and the like.

In the above example, rather than polling for both A and B, the management station need only poll for the desired variable or variable which express the values it wishes to evaluate (for example, A+B). Evaluating these expressions on the SNMP agent reduces the network traffic, as the management station does not have to poll for the individual values of the SNMP objects in the expression.

Embodiments of the present invention described herein are discussed with specific references to SNMP in order to facilitate understanding, but the mechanisms and methodology described herein work equally well with other network management protocols such as simple network management protocol version 2 (SNMPv2).

Figure 5:
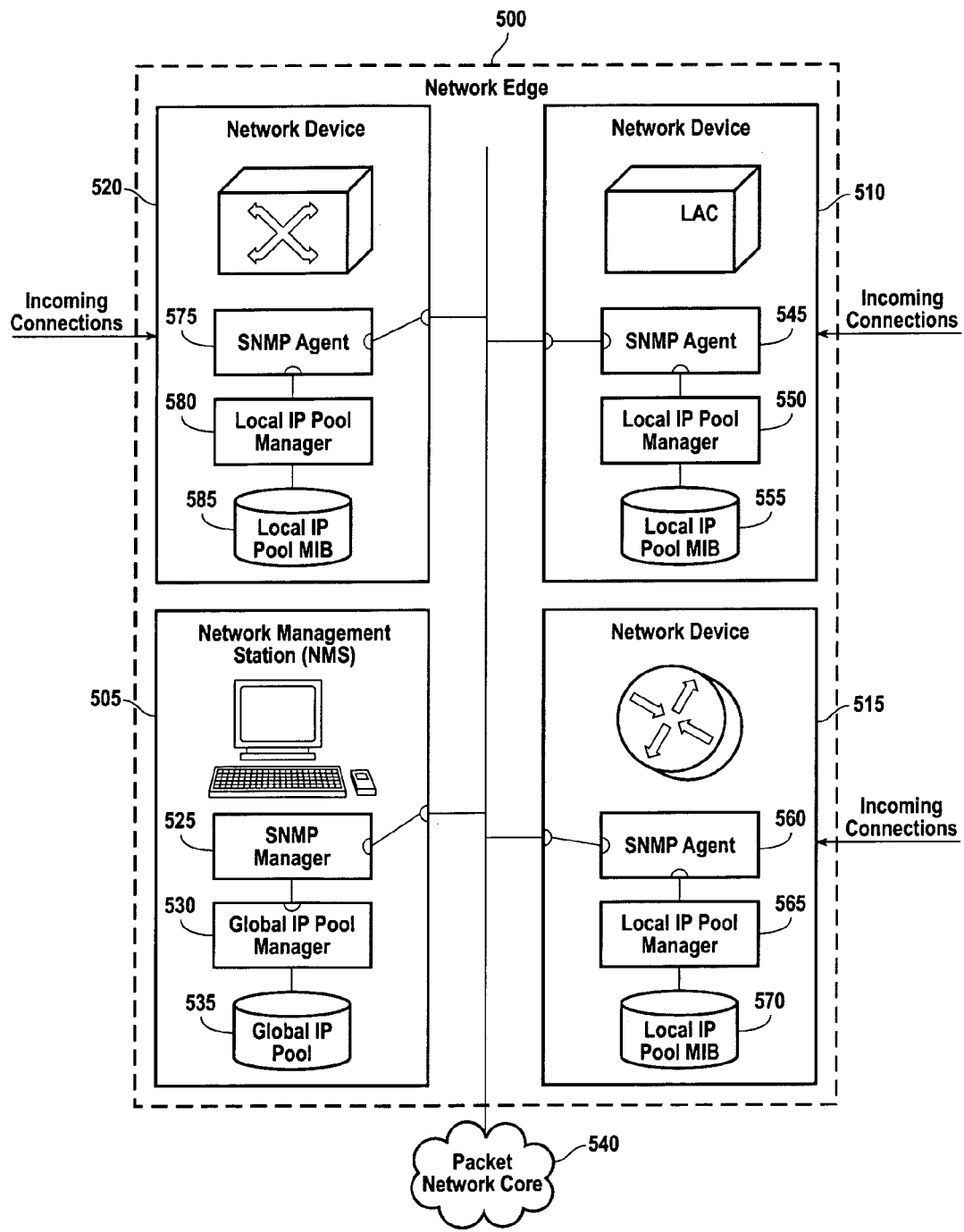
FIG. 5 is a block diagram that illustrates a system for IP pool management in accordance with one embodiment of the present invention.

Turning now to FIG. 5, a block diagram that illustrates a system for IP pool management in accordance with one embodiment of the present invention is presented. FIG. 5 shows a network edge 500 that includes network management station 505 and network edge devices 510, 515, 520. Network Management Station 505 includes a SNMP Manager 525 that performs network management functions, a global IP pool manager 530 and a global IP pool 535.

Still referring to FIG. 5, network edge devices 510, 515, 520 aggregate traffic from one or more access interfaces and forward packets over packet network core 540. The access interfaces may include, by way of example, dial, IP, ATM, Frame Relay, leased line, wireless, xDSL and cable. Each of the network edge devices 510, 515, 520 includes a SNMP management agent, a local IP pool manager and a local IP pool MIB. Specifically, network edge device 510 includes management agent 545, local IP pool manager 550 and MIB 555; network edge device 515 includes management agent 560, local IP pool manager 565 and MIB 570; network edge device 520 includes management agent 575, local IP pool manager 580 and MIB 585. In keeping with the continuing example of SNMP network management systems, each of the management agents 545, 560, 575 are depicted in FIG. 5 as "SNMP agents".

The operation of the network that includes network management station 505 and network edge devices 510, 515, 520 is now described with respect to the SNMP. To configure the operation of network edge devices 510, 515, 520, network manager 505 transmits a SNMP message addressed to the network address of network edge devices 510, 515, 520. The SNMP message includes an initial configuration for the local IP pool associated with the network edge device. The SNMP message is processed by the SNMP agent that manages the affected resources using its local MIB.

When a network edge device 510, 515, 520 receives an incoming connection request requiring an IP address, the local IP address pool manager 550, 565, 580 determines whether an IP address from its local IP pool 555, 570, 585 is available. If there are no IP addresses available or if the number of available IP addresses is below a minimum amount, SNMP agent 545, 560, 575 sends an IP address usage alert to the global IP pool manager 530. Network edge devices 510, 515, 520 are also configured to receive an IP address allocation message. IP address allocation information is stored in local IP pool 555, 570, 585.

Global IP pool 535 stores information about each pool of IP addresses allocated to network edge devices 510, 515, 520. Global IP pool manager 530 determines what actions to perform to efficiently allocate IP addresses. According to one embodiment of the present invention, global IP pool manager 530 is configured to poll each network edge device for IP address usage information. The global IP pool manager 530 uses this IP address usage information to determine whether the IP address pool should be reallocated for more efficient utilization of the IP address space. According to another embodiment of the present invention, global IP pool manager 530 is configured to asynchronously receive an IP address usage alert from network edge devices. According to another embodiment of the present invention, global IP pool manager 530 is configured to both poll network edge devices for IP address usage information, and to asynchronously receive IP address usage alerts from network edge devices. These embodiments are described in more detail below.

According to one embodiment of the present invention, global IP pool manager 530 determines whether IP address pools should be reallocated based upon a high watermark. The high watermark is a variable included in each local IP address pool MIB 555, 570, 585. The high watermark indicates the highest number of IP addresses simultaneously checked out from a local IP address pool. The high watermark may also be expressed as the lowest number of available IP addresses over a period of time. If the high watermark exceeds a high watermark limit, an indication is made that IP address pools should be reallocated to give more IP addresses to the network element that exceeded the limit.

According to another embodiment of the present invention, global IP pool manager 530 determines whether IP address pools should be reallocated based upon a low watermark. The low watermark is a variable included in each local IP address pool MIB 555, 570, 585. The low watermark indicates the lowest number of IP addresses simultaneously checked out from a local IP address pool. The low watermark may also be expressed as the highest number of available IP addresses over a period of time. If the low watermark limit exceeds a low watermark limit, an indication is made that IP address pools should be reallocated to reclaim IP addresses from the network element that exceeded the limit.

Figure 6A:
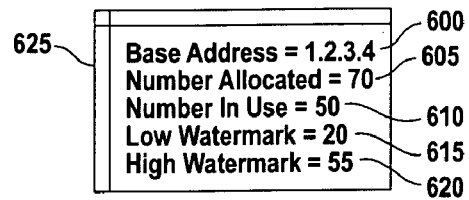
FIG. 6A is a block diagram that illustrates MIB variables stored in a local IP pool MIB in accordance with one embodiment of the present invention.
Figure 6B:
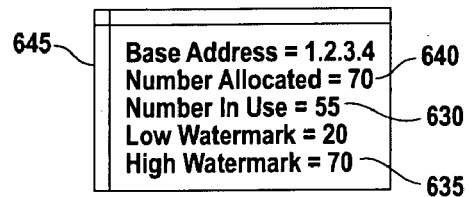
FIG. 6B is a block diagram that illustrates MIB variables stored in a local IP pool MIB in accordance with one embodiment of the present invention.
Figure 6C:
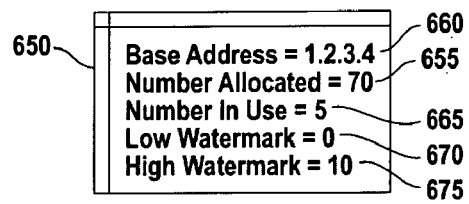
FIG. 6C is a block diagram that illustrates MIB variables stored in a local IP pool MIB in accordance with one embodiment of the present invention.

FIGS. 6A–6C illustrate MIB variables stored in local IP pool MIBs in accordance with embodiments of the present invention. Referring to FIG. 6A, the variables represented include a local IP pool base address 600, the number of IP addresses allocated to the local IP pool 605, the number of IP addresses currently in use 610, a low watermark 615 and a high watermark 620. In FIG. 6A, the network device associated with MIB 625 is allocated 70 (605) IP addresses, in the range 1.2.3.4 (600) to 1.2.3.73. Fifty (610) of the allocated addresses are currently in use. Since the last time the MIB variables were reset, the minimum number of IP addresses simultaneously checked out was 20 (615), and the maximum number of IP addresses simultaneously checked out was 55 (620).

FIG. 6B is the same as FIG. 6A except that the number of IP addresses currently in use is 55 (630) and the high watermark is 70 (635). The high watermark 635 is the same value as the number of IP addresses allocated to the local IP address pool 640, indicating that all allocated IP addresses were in use at some time. If another connection request was received while all allocated IP addresses were in use, service may have been denied. This indicates that not enough IP addresses are currently allocated to the network device associated with MIB 645.

In FIG. 6C, the network device associated with MIB 650 is allocated 70 (655) IP addresses, in the range 1.2.3.4 (660) to 1.2.3.73. Five (665) of the allocated addresses are currently in use. Since the last time the MIB variables were reset, the minimum number of IP addresses simultaneously checked out was 0 (670), and the maximum number of IP addresses simultaneously checked out was 10 (675). In other words, there was a time when no IP addresses were being used, and no more than ten IP addresses were in use at the same time. This indicates too many IP addresses may have been allocated to the network device associated with MIB 650.

According to one embodiment of the present invention, an expression MIB is used to hold a high watermark percentage. The high watermark percentage is defined as (High watermark)/(Number of allocated IP addresses) *100.

According to another embodiment of the present invention, an expression MIB is used to hold a low watermark percentage.

(Low watermark)/ (Number of allocated IP addresses) *100.

The Network Management Station may poll the network elements for the high watermark percentage and the low watermark percentage and then reallocate IP pools when the polled values exceed a predetermined amount. Alternatively, the network elements may notify the Network Management Station when the high watermark percentage and the low watermark percentage exceed a predetermined amount, indicating that IP pool should be reallocated. According to one embodiment of the present invention, the Network Management Station is notified via a SNMP trap.

The description of how low watermark percentages and high watermark percentages may be used to determine when IP address pools should be reallocated is not intended to be limiting in any way. Those of ordinary skill in the art will recognize that other criteria may be used to determine when IP address pools should be reallocated.

Figure 7:
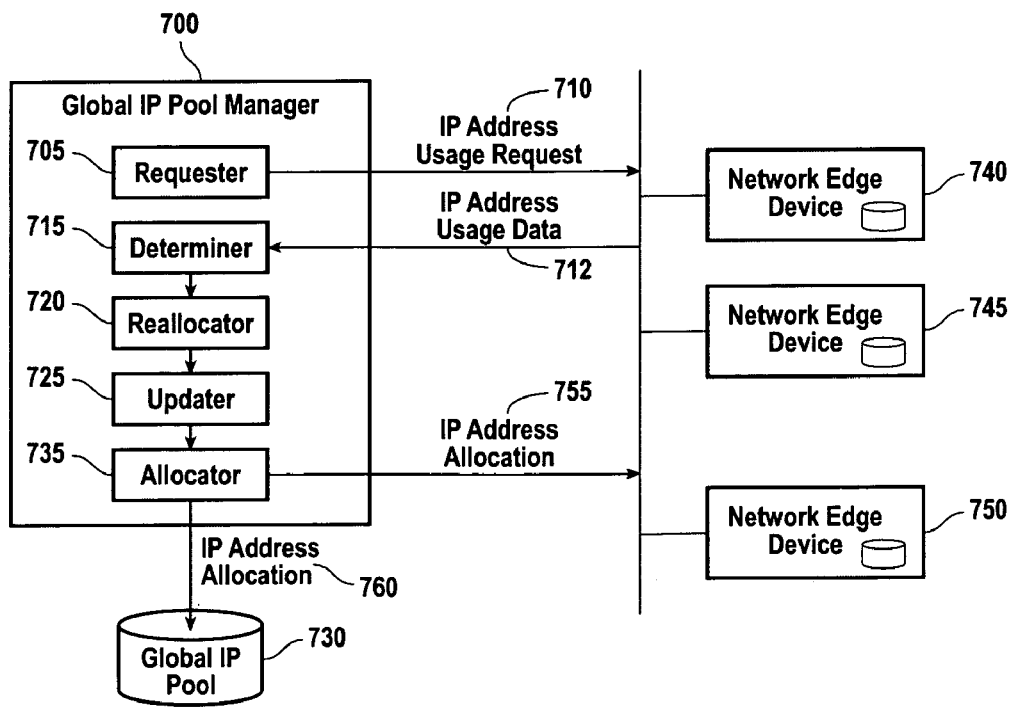
FIG. 7 is a block diagram that illustrates a global IP pool manager in accordance with one embodiment of the present invention.
Figure 8:
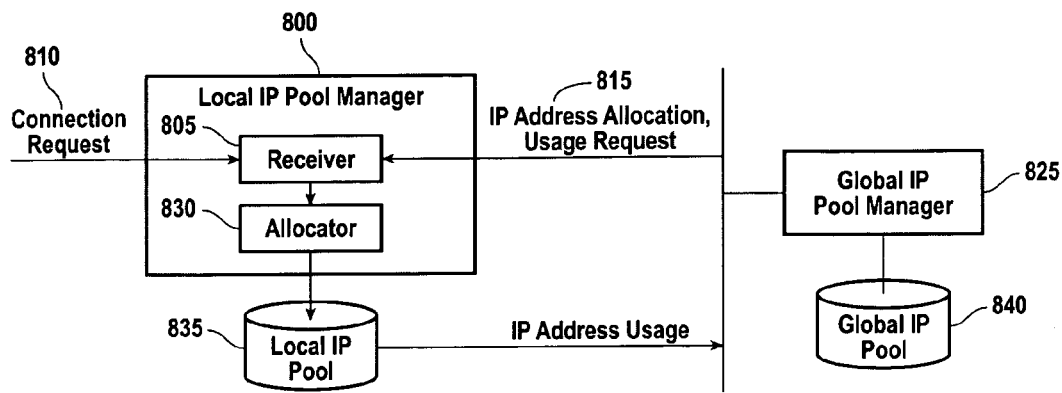
FIG. 8 is a block diagram that illustrates local IP pool manager in accordance with one embodiment of the present invention.
Figure 9:
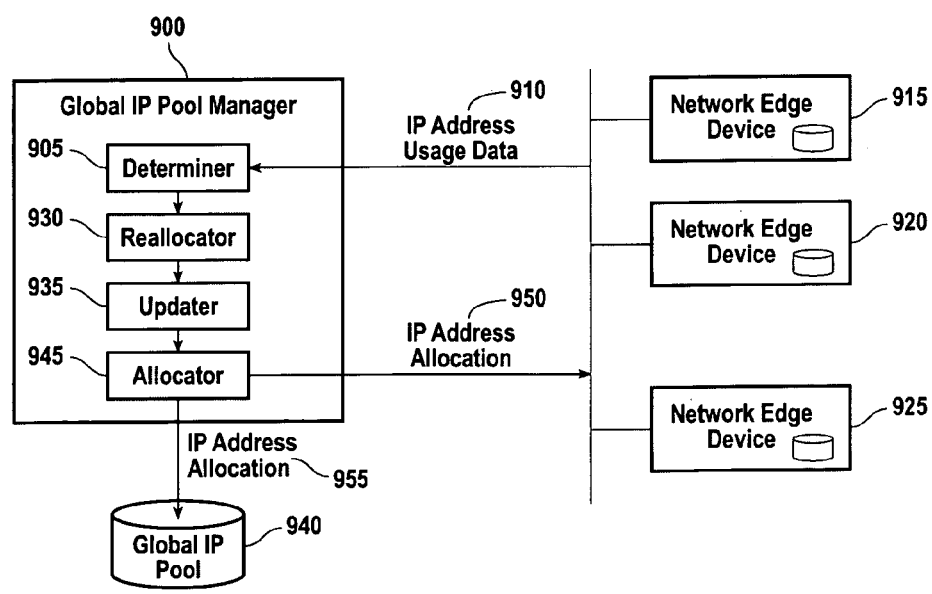
FIG. 9 is a block diagram that illustrates a global IP pool manager in accordance with one embodiment of the present invention.
Figure 10:
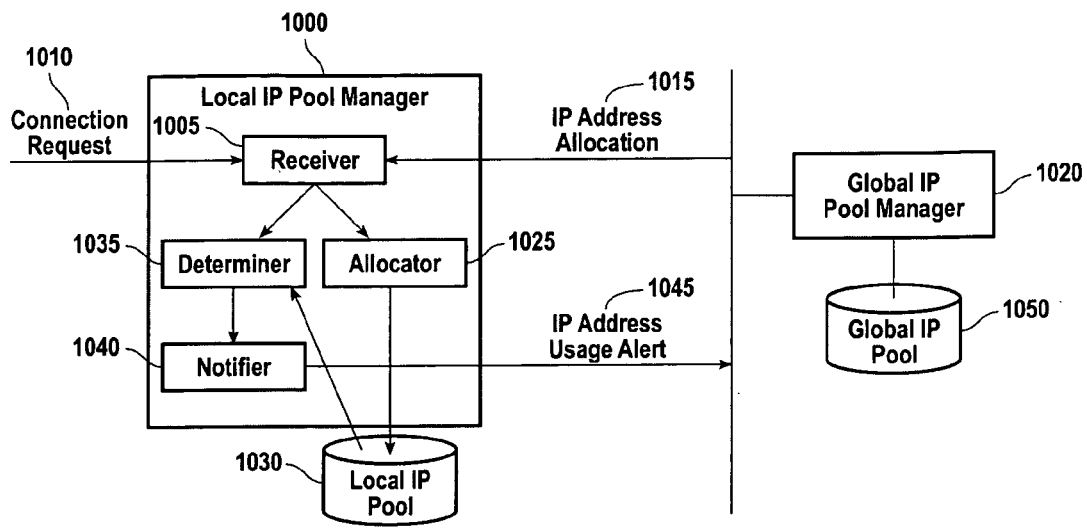
FIG. 10 is a block diagram that illustrates local IP pool manager in accordance with one embodiment of the present invention.

FIGS. 7–10 are block diagrams that provide more detail with respect to FIG. 5. FIGS. 7 and 8 illustrate embodiments that poll network edge devices to obtain IP address usage information. FIGS. 9 and 10 illustrate embodiments that feature asynchronous notification of IP address usage events.

Turning now to FIG. 7, a block diagram that illustrates a global IP pool manager 700 in accordance with one embodiment of the present invention is presented. Requester 705 periodically issues an IP address usage request 710. Determiner 715 receives the requested IP address usage data 712 and determines whether IP address pools should be reallocated among the network edge devices for more efficient use of the IP address space. Reallocator 720 reallocates the IP address pools based upon the determination made by determiner 715. This reallocation may include adding one or more IP address pools to a local pool associated with an edge termination device when determiner 715 indicates the device has an insufficient supply of IP addresses. An updater 725 updates the global IP pool 730 with the IP address usage data. An allocator 735 sends the new IP address allocation 755, 760 to global IP pool 730 and network edge devices 740, 745, 750.

Turning now to FIG. 8, a block diagram that illustrates local IP pool manager 800 in accordance with one embodiment of the present invention is presented. Receiver 805 receives connection requests 810 from subscribers. Receiver 805 also receives IP address allocations 815 and IP address usage requests 820 from global IP pool manager 825. Allocator 830 allocates an available IP address from a local IP address pool 835 when a connection request 810 is received. Memory 835 includes local IP address pool information.

Turning now to FIG. 9, a block diagram that illustrates a global IP pool manager 900 in accordance with one embodiment of the present invention is presented. Determiner 905 receives IP address usage data 910 from network edge devices 915, 920, 925 and determines whether IP address pools should be reallocated among the network edge devices 915, 920, 925 for more efficient use of the IP address space. Reallocator 930 reallocates the IP address pools based upon the determination made by determiner 905. This reallocation may include adding one or more IP address pools to a local pool associated with an edge termination device when determiner 905 indicates the device has an insufficient supply of IP addresses. An updater 935 updates the global IP pool 940 with the IP address usage data 910. An allocator 945 sends the new IP address allocation 955, 950 to global IP pool 940 and network edge devices 915, 920, 925.

Turning now to FIG. 10, a block diagram that illustrates local IP pool manager 1000 in accordance with one embodiment of the present invention is presented. Receiver 1005 receives connection requests 1010 from subscribers. Receiver 1005 also receives IP address allocations 1015 from global IP pool manager 1020. Allocator 1025 allocates an available IP address from a local IP address pool 1030 when a connection request 1010 is received. A determiner 1035 determines whether the local IP address pool 1030 should be adjusted. A notifier 1040 sends an alarm message 1045 to the global IP pool manager 1020 when determiner 1035 determines that the local IP address pool 1030 should be adjusted. Memory 1030 includes local IP address pool information.

Figure 11:
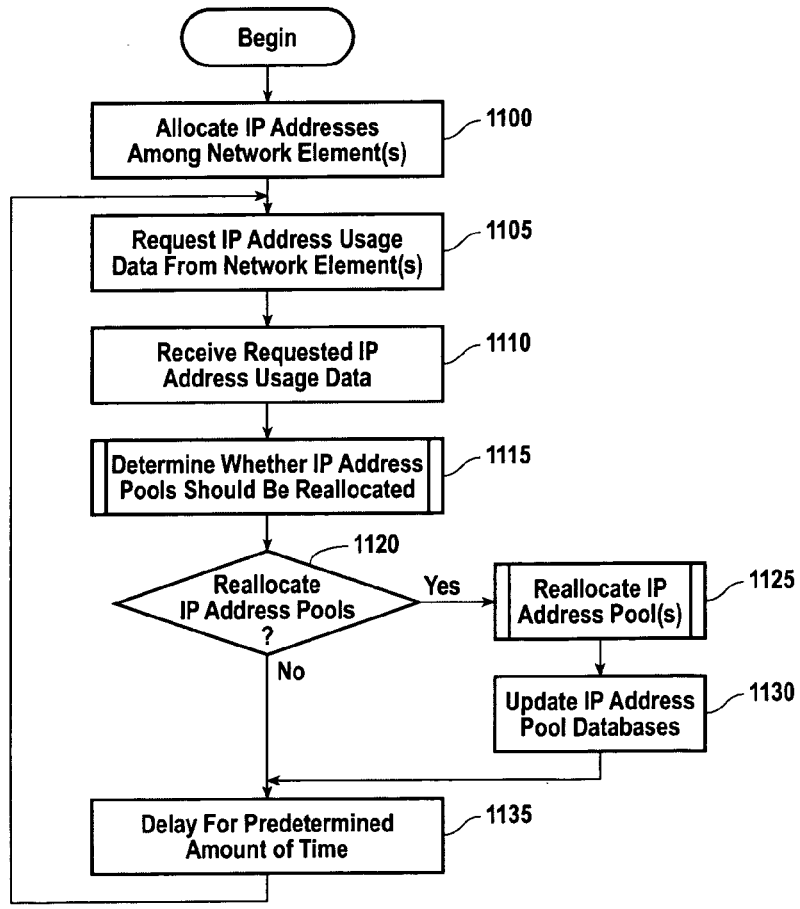
FIG. 11 is a flow diagram that illustrates a method for IP pool management in accordance with one embodiment of the present invention.

Turning now to FIG. 11, a flow diagram that illustrates a method for IP pool management in accordance with one embodiment of the present invention is presented. At 1100, IP addresses are allocated among network elements. IP addresses are allocated according to the expected IP address requirements of each network element. For example, a network edge device expected to utilize 50 IP addresses simultaneously would be allocated more IP addresses than a network edge device expected to utilize 10 IP addresses simultaneously. After the initial IP address allocation has been completed, the network elements are polled to determine the IP address utilization. At 1105, IP address usage data is requested from network elements. At 1110, the requested IP address usage data is received. At 1115, a flag is set to indicate whether IP address pools should be reallocated to make more efficient use of the IP address space. At 1120, the flag set at 1115 is checked. If IP address pools should be reallocated, at 1125, the IP address pools are reallocated and at 1130, the IP address pool databases are updated. At 1135, processing is delayed for a predetermined amount of time before performing another periodic check at 1105.

Figure 12:
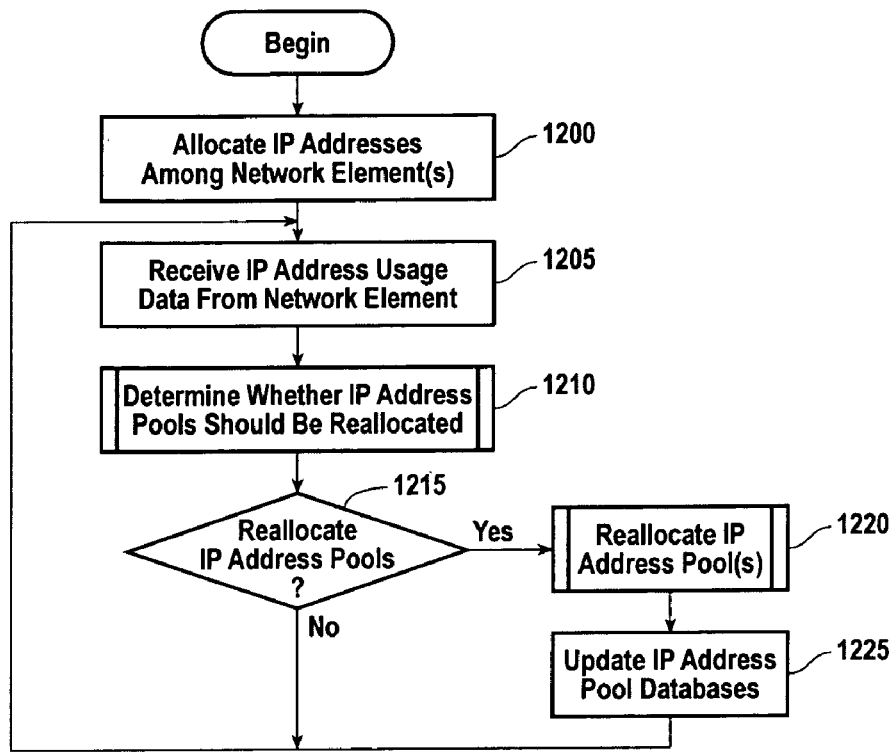
FIG. 12 is a flow diagram that illustrates a method for IP pool management in accordance with one embodiment of the present invention.

Turning now to FIG. 12, a flow diagram that illustrates a method for IP pool management in accordance with one embodiment of the present invention is presented. At 1200, IP addresses are allocated among network elements. At 1205, an IP address usage alert is received from a network element. At 1210, a flag is set to indicate whether IP address pools should be reallocated. At 1215, the flag set at 1210 is checked. If IP address pools should be reallocated, at 1220, the IP address pools are reallocated and at 1225, the IP address pool databases are updated. Processing continues at 1205 when another IP address usage alert is received from a network element.

Figure 13:
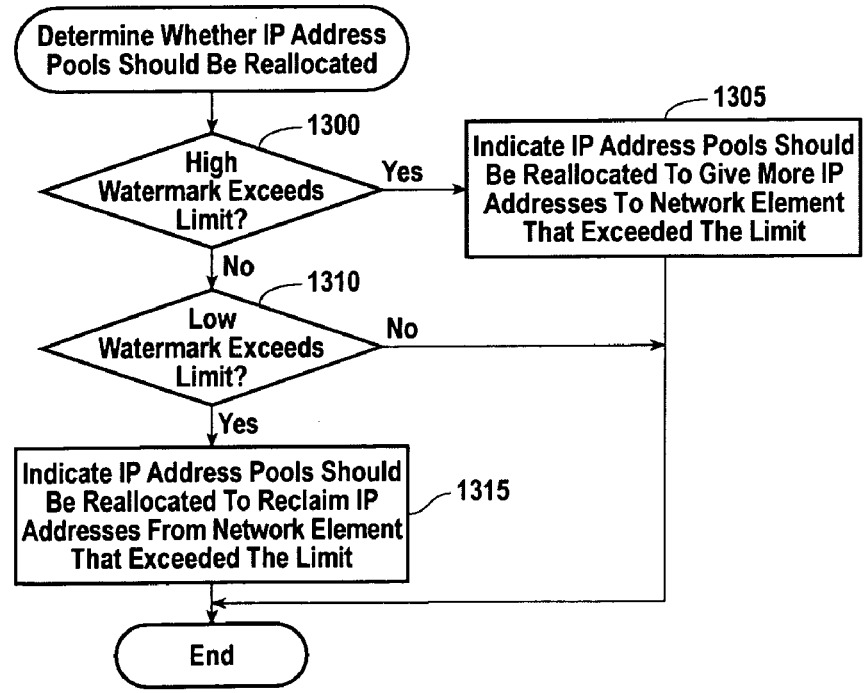
FIG. 13 is a flow diagram that illustrates a method for determining whether IP address pools should be reallocated in accordance with one embodiment of the present invention.

Turning now to FIG. 13, a flow diagram that illustrates a method for determining whether IP address pools should be reallocated in accordance with one embodiment of the present invention is presented. FIG. 13 provides more detail with respect to reference numeral 1115 of FIG. 11 and reference numeral 1210 of FIG. 12. At 1300, a determination is made regarding whether a high watermark limit has been exceeded. If the high watermark limit has been exceeded, at 1305, an indication is made that IP address pools should be reallocated to give more IP addresses to the network element that exceeded the high watermark limit. This reallocation may include adding one or more IP address pools to a local pool associated with the network element. If the high watermark limit has not been exceeded, at 1310, a determination is made regarding whether a low watermark limit has been exceeded. If the low watermark limit has been exceeded, at 1315, an indication is made that IP address pools should be reallocated to reclaim IP addresses from the network element that exceeded the limit.

Figure 14:
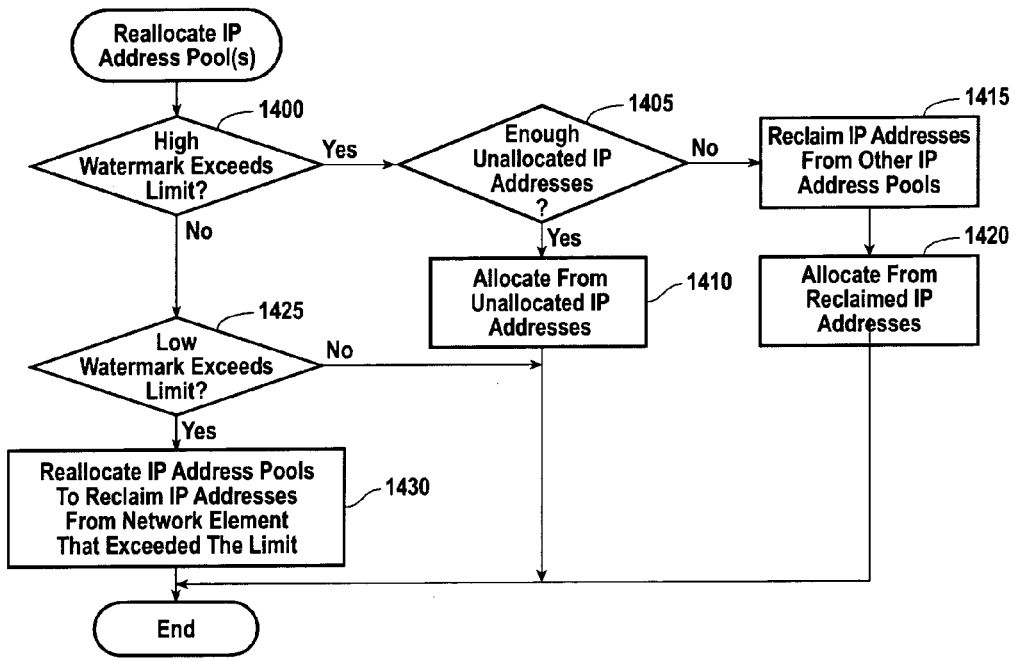
FIG. 14 is a flow diagram that illustrates a method for reallocating IP address pools in accordance with one embodiment of the present invention.

Turning now to FIG. 14, a flow diagram that illustrates a method for reallocating IP address pools in accordance with one embodiment of the present invention is presented. FIG. 13 provides more detail with respect to reference numeral 1125 of FIG. 11 and reference numeral 1220 of FIG. 12. At 1400, a determination is made regarding whether a high watermark limit has been exceeded. If the high watermark limit has been exceeded, at 1405, a determination is made regarding whether enough unallocated IP addresses exist. If there are enough unallocated IP addresses, at 1410, the IP addresses are allocated from the unallocated IP addresses maintained by the global IP pool manager. If there are not enough unallocated IP addresses, at 1415, IP addresses are reclaimed from other local IP address pools and at 1420, the IP addresses are allocated from the reclaimed IP addresses. At 1425, a determination is made regarding whether a low watermark limit has been exceeded. If the low watermark limit has been exceeded, at 1430, IP address pools are reallocated to reclaim IP addresses from the network element that exceeded the limit.

Figure 15:
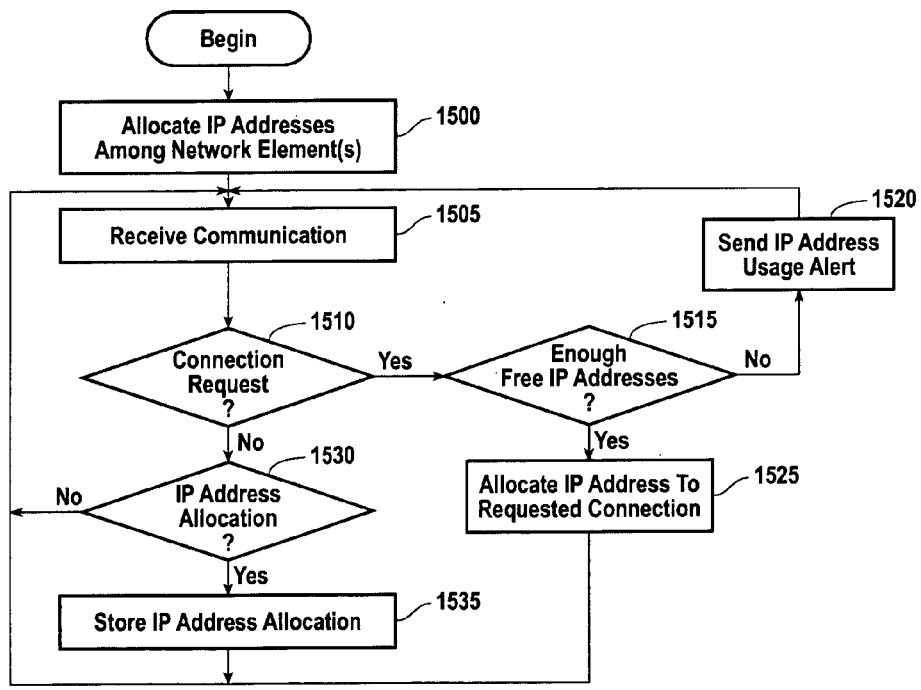
FIG. 15 is a flow diagram that illustrates a method for IP address management in accordance with one embodiment of the present invention.

Turning now to FIG. 15, a flow diagram that illustrates a method for IP pool management in accordance with one embodiment of the present invention is presented. At 1500, IP addresses are allocated among network elements. At 1505, a communication is received by a network edge device capable of receiving connection requests. At 1510, a determination is made regarding whether the communication is a connection request. If the communication is a connection request, at 1515, a determination is made regarding whether there are enough free IP addresses. If there are not enough free IP addresses, at 1520, an IP address usage alert is sent. If there are enough free IP addresses, at 1525, one of the free IP addresses is allocated to the connection request. If the communication is not a connection request, at 1530, a determination is made regarding whether the communication is an IP address allocation. If the communication is an IP address allocation, at 1535, the IP address allocation is stored. Processing continues at 1505 when another communication is received.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for managing Internet Protocol (IP) addresses on a data communications network, comprising:
    allocating a plurality of local IP address pools, each of said local IP address pools associated with a different network edge device capable of accepting connection requests requiring an IP address, said network edge device having a local memory, said local memory including a local IP address pool database;
    requesting IP address usage data from one or more of said network edge devices;
    receiving said requested IP address usage data;

determining whether one or more of said plurality of local IP address pools should be reallocated based upon at least said requested IP address usage data;

reallocating one or more of said plurality of local IP address pools based upon said determining; and updating one or more of said local IP address pool databases and a global IP pool database based upon said reallocating, said global IP address pool database including the information maintained in each said local IP address pool;

wherein said local IP address pool includes a high watermark that indicates a measurement of the maximum number of IP addresses used by said network edge device;

said determining further comprises ascertaining whether said high watermark of a local address pool exceeds a high watermark limit; and said method further comprises indicating one or more IP address pools should be reallocated to give more IP addresses to the network element associated with said high watermark when said high watermark exceeds said high watermark limit.

2. The method of claim 1 wherein:

each said local IP address pool further comprises a low watermark that indicates the minimum number of IP addresses used by said network edge device;

said determining further comprises ascertaining whether said low watermark of said address pool exceeds a low watermark limit; and said method further comprises indicating one or more IP address pools should be reallocated to reclaim IP addresses from the network element associated with said low watermark when said low watermark exceeds said low watermark limit.

3. The method of claim 2 wherein said reallocating further comprises:

allocating an IP address from IP addresses reclaimed from other IP address pools when said high watermark exceeds said high watermark limit and when the number of unallocated IP addresses is insufficient;

allocating an IP addresses from unallocated IP addresses when said high watermark exceeds said high watermark limit and when the number of unallocated IP addresses is sufficient; and reallocating one or more IP address pools to reclaim IP addresses from a local IP address pool when said high watermark is less than said high watermark limit and said low watermark is greater than said low watermark limit.

4. The method of claim 2 wherein:

said low watermark is expressed as a percentage of allocated IP addresses; and said high watermark is expressed as a percentage of allocated IP addresses.

5. The method of claim 4 wherein said network operates according to a simple network management protocol (SNMP).

6. The method of claim 5 wherein:

said low watermark is stored in an expression MIB; and said high watermark is stored in an expression MIB.

7. The method of claim 1 wherein:

each said local IP address pool further comprises a low watermark that indicates the minimum number of IP addresses used by said network edge device; said determining further comprises ascertaining whether said low watermark of said address pool exceeds a low watermark limit; and said method further comprises indicating one or more IP address pools should be reallocated to reclaim IP addresses from the network element associated with said low watermark when said low watermark exceeds said low watermark limit.

8. A method for managing Internet Protocol (IP) addresses on a data communications network, comprising:

allocating a plurality of local IP address pools, each of said local IP address pools associated with a different network edge device capable of accepting connection requests requiring an IP address, said network edge device having a local memory, said local memory including a local IP address pool database;

requesting IP address usage data from one or more of said network edge devices;

receiving said requested IP address usage data;

determining whether one or more of said plurality of local IP address pools should be reallocated based upon at least said requested IP address usage data;

reallocating one or more of said plurality of local IP address pools based upon said determining; and updating one or more of said local IP address pool databases and a global IP pool database based upon said reallocating said global IP address pool database including the information maintained in each said local IP address pool; wherein:

said local IP address pool includes a high watermark that indicates a measurement of the maximum number of IP addresses used by said network edge device;

said determining further comprises ascertaining whether said high watermark of a local address pool exceeds a high watermark limit; and said method further comprises indicating one or more IP address pools should be reallocated to give more IP addresses to the network element associated with said high watermark when said high watermark exceeds said high watermark limit.

9. The method of claim 8 wherein:

each said local IP address pool further comprises a low watermark that indicates the minimum number of IP addresses used by said network edge device;

said determining further comprises ascertaining whether said low watermark of said address pool exceeds a low watermark limit; and said method further comprises indicating one or more IP address pools should be reallocated to reclaim IP addresses from the network element associated with said low watermark when said low watermark exceeds said low watermark limit.

10. The method of claim 9 wherein said reallocating further comprises:

allocating an IP address from IP addresses reclaimed from other IP address pools when said high watermark exceeds said high watermark limit and when the number of unallocated IP addresses is insufficient;

allocating an IP addresses from unallocated IP addresses when said high watermark exceeds said high watermark limit and when the number of unallocated IP addresses is sufficient; and reallocating one or more IP address pools to reclaim IP addresses from a local IP address pool when said high watermark is less than said high watermark limit and said low watermark is greater than said low watermark limit.

11. The method of claim 9 wherein:

said low watermark is expressed as a percentage of allocated IP addresses; and said high watermark is expressed as a percentage of allocated IP addresses.

12. The method of claim 11 wherein said network operates according to a simple network management protocol (SNMP).

13. The method of claim 12 wherein:
said low watermark is stored in an expression MIB; and
said high watermark is stored in an expression MIB.

14. The method of claim 8 wherein:
each said local IP address pool further comprises a low watermark that indicates the minimum number of IP addresses used by said network edge device;
said determining further comprises ascertaining whether said low watermark of said address pool exceeds a low watermark limit; and
said method further comprises indicating one or more IP address pools should be reallocated to reclaim IP addresses from the network element associated with said low watermark when said low watermark exceeds said low watermark limit.

15. An apparatus for managing Internet Protocol (IP) addresses on a data communications network, the apparatus comprising:
means for allocating a plurality of local IP address pools, each of said local IP address pools associated with a different network edge device capable of accepting connection requests requiring an IP address, said network edge device having a local memory, said local memory including a local IP address pool database;
means for requesting IP address usage data from one or more of said network edge devices;
means for receiving said requested IP address usage data;
means for determining whether one or more of said plurality of local IP address pools should be reallocated based upon at least said requested IP address usage data;
means for reallocating one or more of said plurality of local IP address pools based upon said determining; and
means for updating one or more of said local IP address pool databases and a global IP pool database based upon said reallocating, said global IP address pool database including the information maintained in each said local IP address pool; wherein:
said local IP address pool includes a high watermark that indicates a measurement of the maximum number of IP addresses used by said network edge device;
said means for determining further comprises means for ascertaining whether said high watermark of a local address pool exceeds a high watermark limit; and
said apparatus further comprises means for indicating one or more IP address pools should be reallocated to give more IP addresses to the network element associated with said high watermark when said high watermark exceeds said high watermark limit.

16. The apparatus of claim 15 wherein:
each said local IP address pool further comprises a low watermark that indicates the minimum number of IP addresses used by said network edge device;
said means for determining further comprises means for ascertaining whether said low watermark of said address pool exceeds a low watermark limit; and
said apparatus further comprises means for indicating one or more IP address pools should be reallocated to reclaim IP addresses from the network element associated with said low watermark when said low watermark exceeds said low watermark limit.

17. The apparatus of claim 16 wherein said reallocating further comprises:
means for allocating an IP address from IP addresses reclaimed from other IP address pools when said high watermark exceeds said high watermark limit and when the number of unallocated IP addresses is insufficient;
means for allocating an IP addresses from unallocated IP addresses when said high watermark exceeds said high watermark limit and when the number of unallocated IP addresses is sufficient; and
means for reallocating one or more IP address pools to reclaim IP addresses from a local IP address pool when said high watermark is less than said high watermark limit and said low watermark is greater than said low watermark limit.

18. The apparatus of claim 16 wherein:
said low watermark is expressed as a percentage of allocated IP addresses; and
said high watermark is expressed as a percentage of allocated IP addresses.

19. The apparatus of claim 18 wherein said network operates according to a simple network management protocol (SNMP).

20. The apparatus of claim 19 wherein:
said low watermark is stored in an expression MIB; and
said high watermark is stored in an expression MIB.

21. The apparatus of claim 15 wherein:
each said local IP address pool further comprises a low watermark that indicates the minimum number of IP addresses used by said network edge device;
said means for determining further comprises ascertaining whether said low watermark of said address pool exceeds a low watermark limit; and
said apparatus further comprises means for indicating one or more IP address pools should be reallocated to reclaim IP addresses from the network element associated with said low watermark when said low watermark exceeds said low watermark limit.

22. An apparatus capable of managing Internet Protocol (IP) addresses on a data communications network, said apparatus comprising:
a memory for storing a global IP address pool; and
a global IP pool manager, comprising:
an allocator capable of allocating a plurality of local IP address pools, each of said local IP address pools associated with a different network edge device capable of accepting connection requests requiring an IP address;
a requestor capable of requesting IP address usage data from one or more of said network edge devices;
a determiner capable of determining whether one or more of said plurality of local IP address pools should be reallocated based upon at least said requested IP address usage data;
a reallocator capable of reallocating one or more of said plurality of local IP address pools based upon said an indication from said determiner; and
an updater capable of updating one or more of said local IP address pool databases and said global IP pool database based upon said reallocating; wherein:
said local IP address pool includes a high watermark that indicates a measurement of the maximum number of IP addresses used by said network edge device; and
said determiner is further configured to ascertain whether said high watermark of a local address pool exceeds a high watermark limit and to indicate IP address pool should be reallocated to give more IP addresses to the network element associated with said high watermark when said high watermark exceeds said high watermark limit.

23. The apparatus of claim 22 wherein:
each said local IP address pool further comprises a low watermark that indicates the minimum number of IP addresses used by said network edge device; and
said determiner is further configured to ascertain whether said low watermark of said address pool exceeds a low watermark limit and to indicate one or more IP address pools should be reallocated to reclaim IP addresses from the network element associated with said low watermark when said low watermark exceeds said low watermark limit.

24. The apparatus of claim 23 wherein said reallocator further configured to:
allocate an IP address from IP addresses reclaimed from other IP address pools when said high watermark exceeds said high watermark limit and when the number of unallocated IP addresses is insufficient;
allocate an IP addresses from unallocated IP addresses when said high watermark exceeds said high watermark limit and when the number of unallocated IP addresses is sufficient; and
reallocate one or more IP address pools to reclaim IP addresses from a local IP address pool when said high watermark is less than said high watermark limit and said low watermark is greater than said low watermark limit.

25. The apparatus of claim 23 wherein:
said low watermark is expressed as a percentage of allocated IP addresses; and
said high watermark is expressed as a percentage of allocated IP addresses.

26. The apparatus of claim 25 wherein said network operates according to a simple network management protocol (SNMP).

27. The apparatus of claim 26 wherein:
said low watermark is stored in an expression MIB; and
said high watermark is stored in an expression MIB.

28. The apparatus of claim 22 wherein:
each said local IP address pool further comprises a low watermark that indicates the minimum number of IP addresses used by said network edge device; and
said determiner is further configured to ascertain whether said low watermark of said address pool exceeds a low watermark limit and to indicate one or more IP address pools should be reallocated to reclaim IP addresses from the network element associated with said low watermark when said low watermark exceeds said low watermark limit.

29. A method for managing Internet Protocol (IP) addresses on a data communications network, comprising:
allocating a plurality of local IP address pools, each of said local IP address pools associated with a different network edge device capable of accepting connection requests requiring an IP address, said network edge device having a local memory, said local memory including a local IP address pool database;
requesting IP address usage data from one or more of said network edge devices;
receiving said requested IP address usage data;
determining whether one or more of said plurality of local IP address pools should be reallocated based upon at least said requested IP address usage data;
reallocating one or more of said plurality of local IP address pools based upon said determining;
updating one or more of said local IP address pool databases and a global IP pool database based upon said reallocating, said global IP address pool database including the information maintained in each said local IP address pool;
wherein said local IP address pool includes a high watermark that indicates the maximum number of IP addresses used by said network edge device;
wherein said determining further comprises ascertaining whether said high watermark of a local address pool exceeds a high watermark limit;
indicating one or more IP address pools should be reallocated to give more IP addresses to the network element associated with said high watermark when said high watermark exceeds said high watermark limit;
wherein each said local IP address pool further comprises a low watermark that indicates the minimum number of IP addresses used by said network edge device;
wherein said determining further comprises ascertaining whether said low watermark of said address pool exceeds a low watermark limit; and
indicating one or more IP address pools should be reallocated to reclaim IP addresses from the network element associated with said low watermark when said low watermark exceeds said low watermark limit.

30. The method of claim 29 wherein said reallocating further comprises:
allocating an IP address from IP addresses reclaimed from other IP address pools when said high watermark exceeds said high watermark limit and when the number of unallocated IP addresses is insufficient;
allocating an IP addresses from unallocated IP addresses when said high watermark exceeds said high watermark limit and when the number of unallocated IP addresses is sufficient; and
reallocating one or more IP address pools to reclaim IP addresses from a local IP address pool when said high watermark is less than said high watermark limit and said low watermark is greater than said low watermark limit.

31. The method of claim 29 wherein:
each said local IP address pool further comprises a low watermark that indicates the minimum number of IP addresses used by said network edge device; said determining further comprises ascertaining whether said low watermark of said address pool exceeds a low watermark limit; and
said method further comprises indicating one or more IP address pools should be reallocated to reclaim IP addresses from the network element associated with said low watermark when said low watermark exceeds said low watermark limit.

32. The method of claim 29 wherein:
said low watermark is expressed as a percentage of allocated IP addresses; and
said high watermark is expressed as a percentage of allocated IP addresses.

33. The method of claim 29 wherein said network operates according to a simple network management protocol (SNMP).

34. The method of claim 33 wherein:
said low watermark is stored in an expression MIB; and
said high watermark is stored in an expression MIB.

35. A program storage device readable by a machine, embodying a program of instructions executable by the machine to perform a method to manage Internet Protocol (IP) addresses on a data communications network, the method comprising:

allocating a plurality of local IP address pools, each of said local IP address pools associated with a different network edge device capable of accepting connection requests requiring an IP address, said network edge device having a local memory, said local memory including a local IP address pool database;

requesting IP address usage data from one or more of said network edge devices;

receiving said requested IP address usage data;

determining whether one or more of said plurality of local IP address pools should be reallocated based upon at least said requested IP address usage data;

reallocating one or more of said plurality of local IP address pools based upon said determining;

updating one or more of said local IP address pool databases and a global IP pool database based upon said reallocating, said global IP address pool database including the information maintained in each said local IP address pool;

wherein said local IP address pool includes a high watermark that indicates the maximum number of IP addresses used by said network edge device;

wherein said determining further comprises ascertaining whether said high watermark of a local address pool exceeds a high watermark limit;

indicating one or more IP address pools should be reallocated to give more IP addresses to the network element associated with said high watermark when said high watermark exceeds said high watermark limit;

wherein each said local IP address pool further comprises a low watermark that indicates the minimum number of IP addresses used by said network edge device;

wherein said determining further comprises ascertaining whether said low watermark of said address pool exceeds a low watermark limit; and indicating one or more IP address pools should be reallocated to reclaim IP addresses from the network element associated with said low watermark when said low watermark exceeds said low watermark limit.

36. The program storage device of claim 35 wherein said reallocating further comprises:

allocating an IP address from IP addresses reclaimed from other IP address pools when said high watermark exceeds said high watermark limit and when the number of unallocated IP addresses is insufficient;

allocating an IP addresses from unallocated IP addresses when said high watermark exceeds said high watermark limit and when the number of unallocated IP addresses is sufficient; and reallocating one or more IP address pools to reclaim IP addresses from a local IP address pool when said high watermark is less than said high watermark limit and said low watermark is greater than said low watermark limit.

37. The program storage device of claim 35 wherein:

each said local IP address pool further comprises a low watermark that indicates the minimum number of IP addresses used by said network edge device; said determining further comprises ascertaining whether said low watermark of said address pool exceeds a low watermark limit; and said method further comprises indicating one or more IP address pools should be reallocated to reclaim IP addresses from the network element associated with said low watermark when said low watermark exceeds said low watermark limit.

38. The program storage device of claim 35 wherein:

said low watermark is expressed as a percentage of allocated IP addresses; and said high watermark is expressed as a percentage of allocated IP addresses.

39. The program storage device of claim 35 wherein said network operates according to a simple network management protocol (SNMP).

40. The program storage device of claim 39 wherein:

said low watermark is stored in an expression MIB; and said high watermark is stored in an expression MIB.

41. An apparatus for managing Internet Protocol (IP) addresses on a data communications network, comprising:

means for allocating a plurality of local IP address pools, each of said local IP address pools associated with a different network edge device capable of accepting connection requests requiring an IP address, said network edge device having a local memory, said local memory including a local IP address pool database;

means for requesting IP address usage data from one or more of said network edge devices;

means for receiving said requested IP address usage data;

means for determining whether one or more of said plurality of local IP address pools should be reallocated based upon at least said requested IP address usage data;

means for reallocating one or more of said plurality of local IP address pools based upon said determining;

means for updating one or more of said local IP address pool databases and a global IP pool database based upon said reallocating, said global IP address pool database including the information maintained in each said local IP address pool;

wherein said local IP address pool includes a high watermark that indicates the maximum number of IP addresses used by said network edge device;

wherein said means for determining further comprises means for ascertaining whether said high watermark of a local address pool exceeds a high watermark limit;

means for indicating one or more IP address pools should be reallocated to give more IP addresses to the network element associated with said high watermark when said high watermark exceeds said high watermark limit;

wherein each said local IP address pool further comprises a low watermark that indicates the minimum number of IP addresses used by said network edge device;

wherein said means for determining further comprises means for ascertaining whether said low watermark of said address pool exceeds a low watermark limit; and means for indicating one or more IP address pools should be reallocated to reclaim IP addresses from the network element associated with said low watermark when said low watermark exceeds said low watermark limit.

42. The apparatus of claim 41 wherein said means for reallocating further comprises:

means for allocating an IP address from IP addresses reclaimed from other IP address pools when said high watermark exceeds said high watermark limit and when the number of unallocated IP addresses is insufficient;

means for allocating an IP addresses from unallocated IP addresses when said high watermark exceeds said high watermark limit and when the number of unallocated IP addresses is sufficient; and means for reallocating one or more IP address pools to reclaim IP addresses from a local IP address pool when said high watermark is less than said high watermark limit and said low watermark is greater than said low watermark limit.

43. The apparatus of claim 41 wherein:
each said local IP address pool further comprises a low watermark that indicates the minimum number of IP addresses used by said network edge device;
said means for determining further comprises means for ascertaining whether said low watermark of said address pool exceeds a low watermark limit; and
said apparatus further comprises means for indicating one or more IP address pools should be reallocated to reclaim IP addresses from the network element associated with said low watermark when said low watermark exceeds said low watermark limit.

44. The apparatus of claim 41 wherein:
said low watermark is expressed as a percentage of allocated IP addresses; and
said high watermark is expressed as a percentage of allocated IP addresses.

45. The apparatus of claim 41 wherein said network operates according to a simple network management protocol (SNMP).

46. The apparatus of claim 45 wherein:
said low watermark is stored in an expression MIB; and
said high watermark is stored in an expression MIB.

47. An apparatus capable of managing Internet Protocol (IP) addresses on a data communications network, said apparatus comprising:
a memory for storing a global IP address pool; and
a global IP pool manager, comprising:
an allocator capable of allocating a plurality of local IP address pools, each of said local IP address pools associated with a different network edge device capable of accepting connection requests requiring an IP address;
a requestor capable of requesting IP address usage data from one or more of said network edge devices;
a determiner capable of determining whether one or more of said plurality of local IP address pools should be reallocated based upon at least said requested IP address usage data;
a reallocator capable of reallocating one or more of said plurality of local IP address pools based upon said an indication from said determiner;
an updater capable of updating one or more of said local IP address pool databases and said global IP pool database based upon said reallocating;
wherein said local IP address pool includes a high watermark that indicates the maximum number of IP addresses used by said network edge device;
wherein said determiner is further configured to ascertain whether said high watermark of a local address pool exceeds a high watermark limit and to indicate IP address pool should be reallocated to give more IP addresses to the network element associated with said high watermark when said high watermark exceeds said high watermark limit;
wherein each said local IP address pool further comprises a low watermark that indicates the minimum number of IP addresses used by said network edge device;
wherein said determiner is further configured to ascertain whether said low watermark of said address pool exceeds a low watermark limit and to indicate one or more IP address pools should be reallocated to reclaim IP addresses from the network element associated with said low watermark when said low watermark exceeds said low watermark limit.

48. The apparatus of claim 47 wherein said reallocator is further configured to:
allocate an IP address from IP addresses reclaimed from other IP address pools when said high watermark exceeds said high watermark limit and when the number of unallocated IP addresses is insufficient;
allocate an IP addresses from unallocated IP addresses when said high watermark exceeds said high watermark limit and when the number of unallocated IP addresses is sufficient; and
reallocate one or more IP address pools to reclaim IP addresses from a local IP address pool when said high watermark is less than said high watermark limit and said low watermark is greater than said low watermark limit.

49. The apparatus of claim 47 wherein:
each said local IP address pool further comprises a low watermark that indicates the minimum number of IP addresses used by said network edge device; and
said determiner is further configured to ascertain whether said low watermark of said address pool exceeds a low watermark limit and to indicate one or more IP address pools should be reallocated to reclaim IP addresses from the network element associated with said low watermark when said low watermark exceeds said low watermark limit.

50. The apparatus of claim 47 wherein:
said low watermark is expressed as a percentage of allocated IP addresses; and
said high watermark is expressed as a percentage of allocated IP addresses.

51. The apparatus of claim 47 wherein said network operates according to a simple network management protocol (SNMP).

52. The apparatus of claim 51 wherein:
said low watermark is stored in an expression MIB; and
said high watermark is stored in an expression MIB.

* * * * *